United States Patent [19]

Jones et al.

[11] Patent Number: 5,063,747

[45] Date of Patent: Nov. 12, 1991

[54] MULTICOMPONENT GAS SORPTION JOULE-THOMSON REFRIGERATION

[75] Inventors: Jack A. Jones, Los Angeles; S. Walter Petrick, La Canada; Steven Bard, Northridge, all of Calif.

[73] Assignee: United States of America as represented by the United States National Aeronautics and Space Administration, Washington, D.C.

[21] Appl. No.: 545,236

[22] Filed: Jun. 28, 1990

[51] Int. Cl.$^5$ ............................................. F17C 11/00
[52] U.S. Cl. ...................................... 62/461; 624/3.2; 624/51.2; 624/467; 624/500
[58] Field of Search ..................... 62/46.1, 51.2, 467, 62/500, 502, 114, 116, 3.2

[56] References Cited

U.S. PATENT DOCUMENTS

| | | | |
|---|---|---|---|
| 3,270,512 | 9/1966 | Webb | 62/477 |
| 4,080,802 | 3/1978 | Annable | 62/51.2 |
| 4,366,680 | 1/1983 | Tward | 62/51.2 |
| 4,566,629 | 1/1986 | Halavais | 62/402 |
| 4,593,534 | 1/1986 | Bloomfield | 62/467 |
| 4,625,522 | 12/1986 | Cheron et al. | 62/500 |
| 4,641,499 | 3/1987 | Jones | 62/48 |
| 4,671,080 | 6/1987 | Gross | 62/467 |
| 4,697,425 | 10/1987 | Jones | 62/467 |
| 4,713,101 | 12/1987 | Spring | 62/8 |
| 4,727,723 | 3/1988 | Durr | 62/54 |
| 4,771,823 | 9/1988 | Chan | 165/61 |
| 4,779,428 | 10/1988 | Chan et al. | 62/467 |
| 4,831,829 | 5/1989 | Jones | 62/22 |
| 4,875,346 | 10/1989 | Jones et al. | 62/467 |

FOREIGN PATENT DOCUMENTS 133689 11/1973 United Kingdom .

Primary Examiner—Ronald C. Capossela
Attorney, Agent, or Firm—Thomas H. Jones; Harold W. Adams; John R. Manning

[57] ABSTRACT

The present invention relates to a cryogenic Joule-Thomson refrigeration capable of pumping multicomponent gases with a single stage sorption compressor system. Alternative methods of pumping a multicomponent gas with a single stage compressor are disclosed. In a first embodiment, the sorbent geometry is such that a void is defined near the output of the sorption compressor. When the sorbent is cooled, the sorbent primarily adsorbs the higher boiling point gas such that the lower boiling point gas passes through the sorbent to occupy the void. When the sorbent is heated, the higher boiling point gas is desorbed at high temperature and pressure and thereafter propels the lower boiling point gas out of the sorption compressor. A mixing chamber is provided to remix the constituent gases prior to expansion of the gas through a Joule-Thomson valve. Other methods of pumping multicomponent gas are disclosed. For example, where the sorbent is porous and the low boiling point gas not adsorb very well, the pores of the sorbent will act as a void space for the lower boiling point gas. Alternatively, a mixed sorbent may be used where a first sorbent component physically adsorbs the high boiling point gas and where the second sorbent component chemically absorbs the low boiling point gas.

16 Claims, 1 Drawing Sheet

MULTICOMPONENT GAS SORPTION JOULE-THOMSON REFRIGERATION

ORIGIN OF THE INVENTION

The invention described herein was made in the performance of work under a NASA contract, and is subject to the provisions of Public Law 96-517 (35 U.S.C. Section 202) in which the Contractor has elected not to retain title.

TECHNICAL FIELD

The present invention relates generally to cryogenic refrigeration systems and, more particularly, to a cryogenic refrigerator that successfully combines the known benefits of multigas refrigerants with the simplicity and dependability of sorption compression techniques.

BACKGROUND ART

The process of expansion cooling was first devised by Siemens in 1857. The process involves precooling a mechanically pumped high pressure gas and then expanding the highly compressed gas through a small orifice and into a cooling vessel. The expanding gas falls in temperature because of doing external work against the pressure in the cooling vessel, also known as the Joule-Thompson effect. Continued operation results in the liquefaction of the gas, which liquid accumulates in the cooling vessel and is available for cooling of an external object.

Cryogenic refrigeration systems are commonly used in the aerospace industry to cool devices such as infrared sensors. It can readily be appreciated that mechanical compressors are troublesome for such applications, not only because of service difficulty, but also particularly because of the introduction of undesirable vibration.

Cryogenic refrigeration systems based on physisorption or chemisorption compressors were developed in response to these needs. Although the principles of both physical and chemical sorption have been studied for well over a century, it was not until 1963 that Vickers of JPL proposed using sorption compressors for a Joule-Thompson refrigeration. Vickers' process is set forth in U.S. Pat. No. 3,270,512.

The so-called sorption compressors operate on the basis of reversible sorption of a gas into or onto a suitable sorbent. In general, a particular gas may be physically adsorbed or chemically absorbed by the sorbent at relatively low pressure and temperature. Heating the sorbent causes the gas to be desorbed at high pressure. The high temperature, high pressure gas may then be precooled and passed through a Joule-Thompson valve where it is expanded and partially liquefied to provide cooling.

The prior art has shown that certain benefits result from the use of multicomponent gas refrigerants. For example, British Patent No. 1,336,892, issued to Alseev et al. on Nov. 14, 1973, discloses the use of such multicomponent gas refrigerants. It was shown by Alseev et al. that the use of multicomponent gas refrigerants could increase cooling efficiency by as much as 10 to 12 times that of the known prior systems.

The known cryogenic refrigerator systems based on sorption pumps have operated with only a single gas. The aerospace industry has been unable to effectively utilize the multigas technology in sorption based systems because such multigas refrigerants have, prior to the present invention, required the use of mechanical compressors. An example of a single gas sorption refrigerator is disclosed in U.S. Pat. No. 4,697,425 issued to Jack Jones on Oct. 6, 1987.

In order to obtain temperatures as low as 80K with such single-gas sorption systems, it has been necessary to use separate thermally coupled sorption stages. For example, cooling to 80K has been achieved, but only by using a charcoal krypton physisorption stage (140K) in combination with an 80K oxygen chemisorption stage. Because of thermal losses at the stage interfaces and other effects, such systems typically require about 180 watts of power per 1 watt of cooling at 80K. It is possible to substantially reduce the power requirement, but only at the cost of increased system complexity.

STATEMENT OF THE INVENTION

It is therefore an object of the present invention to provide a sorption-based cryogenic refrigeration system that addresses the above problems in the prior art;

It is a further object of the present invention to provide a sorption cryogenic refrigeration system that is capable of pumping a multicomponent gas refrigerant;

It is a further object of the present invention to provide the desired levels of cooling while simultaneously reducing the complexity intrinsic to the prior art cooling systems; and It is a further object of the present invention to provide a multigas refrigeration system that operates with only a single stage and without mechanical compressor units.

In accordance with the above objects, the present invention provides a cryogenic cooling apparatus comprising a multicomponent gas containing at least a first component gas and a second component gas, said second component gas having a lower boiling point than said first component gas; a Joule-Thompson valve for partially liquefying said multicomponent gas as it passes therethrough; and a sorption compressor for providing said Joule-Thompson valve with a said multicomponent gas at elevated pressure, said sorption compressor containing a sorbent having a greater affinity for sorbing and desorbing said first component gas than said second component gas, whereby said first component gas may operates as a propellant for said second component gas. In a first alternative embodiment, the second component gas may also be sorbed, physically or chemically, onto a separate sorbent to which it has a higher affinity.

BRIEF DESCRIPTION OF THE DRAWINGS

The just-summarized invention will now be described in detail in conjunction with the drawings, of which.

DETAILED DESCRIPTION OF THE INVENTION

Figure 1:
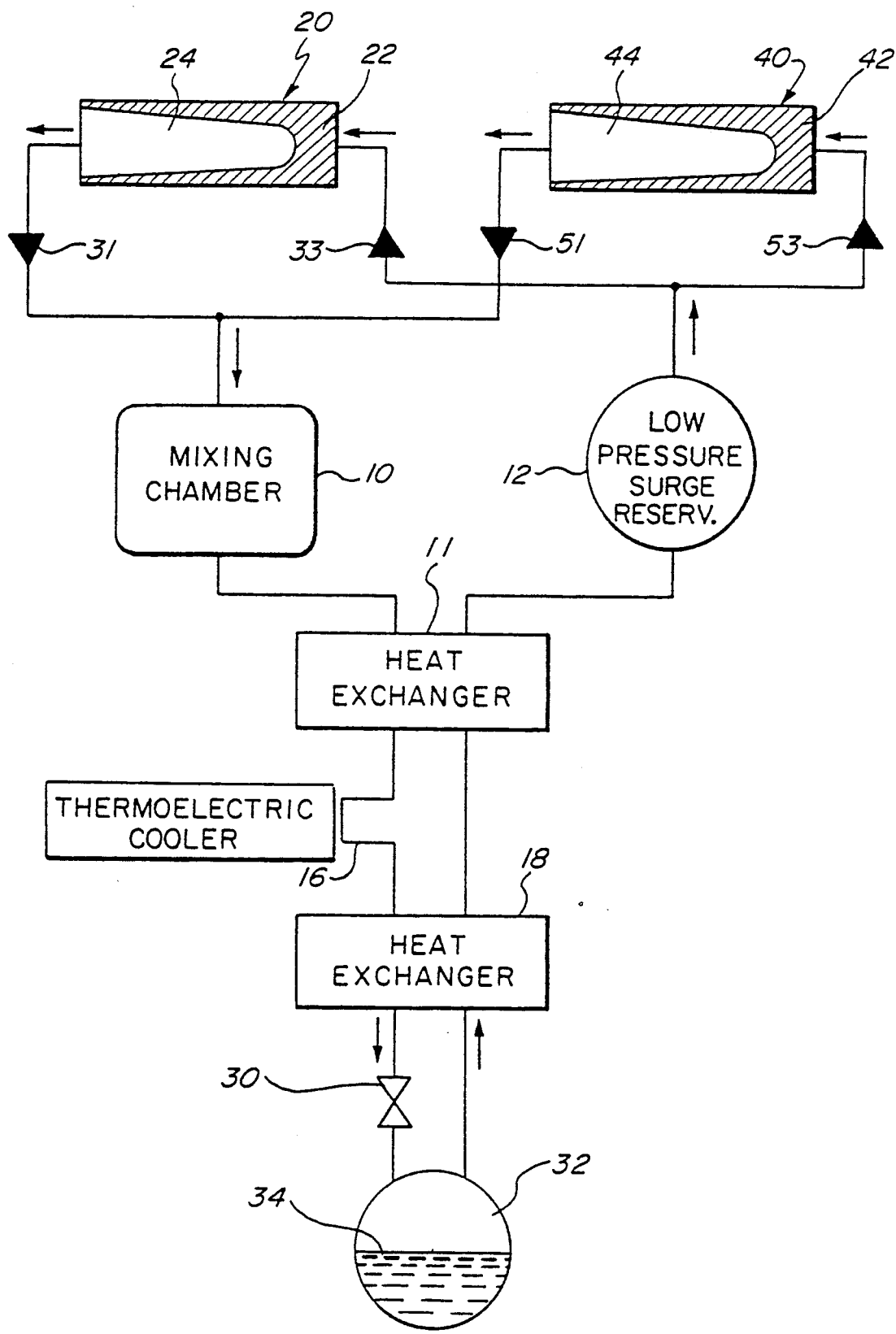
FIG. 1 is a schematic diagram of a preferred embodiment according to the present invention.

The following description is provided to enable any person skilled in the art of cryogenic refrigeration systems to make and use the invention and sets forth the best modes contemplated by the inventors for carrying out the invention. It is understood that various modifications will remain readily apparent to those skilled in these arts, since the herein disclosure relates to the generic principles of providing a multicomponent gas sorption refrigeration system.

The present invention provides a sorption refrigeration system that is capable of operating with a multicomponent gas. In essence, the present invention solves the problem of combining low maintenance sorption compressors with the known benefits of multicomponent gases. The system operates by using easily-adsorbable gases to pump one or more less condensable, low boiling point gases.

As a general rule, lower temperatures are achieved with gases having lower boiling points. The boiling point of a gas is the temperature at which the gas passes from a liquid phase to a gas phase or vice versa. Because cooling in a Joule-Thompson refrigeration system is obtained by partially liquefying a gas, the lower the boiling point of the gas, the lower the potentially achievable temperature. Unfortunately, low boiling point gases have low Van Der Waal forces and are therefore not easily adsorbable. The present invention offers a novel solution of using a relatively high boiling point, easily adsorbable gas, to pump a low boiling point, less adsorbable gas, through a Joule-Thompson valve.

FIG. 1 is a schematic diagram of a first preferred embodiment according to the present invention. As shown, the system is comprised of first and second sorption compressors 20, 40, each having an output that is selectively connected to a mixing chamber 10 via valves 31, 51, respectively. In operation, one of said sorption compressors 20, 40 will be heated to desorb gas at its output, while the other is being cooled to resorb gas provided at its input.

Each sorption compressor 20, 40 is comprised of a sorbent 22, 42 and a void 24, 44. As a mixed or multi-component gas is introduced into the sorption compressor 20, 40, the high boiling point, easily adsorbed gas components are adsorbed by the sorbent 22, 42, whereas the low boiling point, less adsorbable gas components pass through the sorbent and into the void 24, 44 defined within the sorbent compressors.

The system operation will now be described under the assumption that the first sorption compressor 20 is being heated, while the second sorption compressor 40 is being cooled. As heat is applied to the sorbent 22, the easily adsorbed gas is desorbed at elevated pressure and forces the less adsorbable gas occupying the void 24 out of the sorption compressor 20 and into the mixing chamber 10. The mixing chamber 10 is provided so that the high boiling point gas may recombine with the low boiling point gas prior to traveling through the remainder of the system.

The remixed gas passes from mixing chamber 10 through heat exchanger 11, where some of the heat is given off to the relatively low pressure, low temperature gas returning to sorption compressor 40. The remixed gas is further precooled by thermoelectric cooler 16 and then passed through a second heat exchanger 18 prior to expansion through Joule-Thompson valve 30. As the mixed gas is expanded through the Joule-Thompson orifice, the gas becomes partially liquefied 34 within the interior of liquefaction container 32.

Considerably lower temperatures than would be available with a single component gas are achieved by virtue of the low boiling point gases that form part of the multicomponent gas.

As heat from an infrared sensor or other device being cooled passes inward into the liquefaction chamber 32, the liquid 34 boils off and the resulting low pressure, low temperature vapor travels back through heat exchangers 18, 11 to the low pressure surge reservoir 12 prior to reentering and being resorbed by sorption compressor 40. Check valves 31, 33, and 51, 53 are present in order to physically reverse the sorption/desorption operation of the first and second sorption compressors 20, 40.

The following benefits are obtained by employing a multicomponent gas in a sorption Joule-Thompson refrigeration system:

1. The high boiling point gases are particularly amenable to sorption compression techniques;

2. The high boiling point gases generally experience a higher Joule-Thompson cooling effect or rate of cooling as they are expanded through the Joule-Thompson orifice;

3. The high boiling point gases, in conjunction with a suitable sorbent and/or absorption compressor geometry, allow for sorption pumping of low boiling point gases such as neon, hydrogen, or helium, which gases by themselves are generally unsuitable for sorption pump techniques; and 4. The addition of low boiling point gases such as neon, hydrogen, or helium to the multicomponent gas provides a mixture having a boiling point as low as 63K and certainly lower than that obtained with the high boiling point gases alone.

The following table shows various combinations of suitable sorbents and multicomponent gas sorbates:

TABLE I

| Example | Sorbent | Sorbate | Mole Fraction | Precool Temp (k) | J-T Temp (k) |
|---|---|---|---|---|---|
| 1 | None/void | NE | .25 | 160 | 70 |
|   | Carbon + Void | $N_2$ | .25 |   |   |
|   | Carbon | $CH_4$ | .15 |   |   |
|   | Carbon | $C_2H_6$ | .15 |   |   |
|   | Carbon | $C_3H_8$ | .20 |   |   |
| 2 | Vanadium | $H_2$ | .25 | 250 | 70 |
|   | Carbon | $N_2$ | .25 |   |   |
|   | Carbon | $CH_4$ | .15 |   |   |
|   | Carbon | $C_2H_6$ | .15 |   |   |
|   | Carbon | $C_3H_8$ | .20 |   |   |
| 3 | Carbon + Void | $N_2$ | .30 | 150 | 100 |
|   | Carbon | $CH_4$ | .70 |   |   |
| 4 | Carbon + Void | $CH_4$ | .50 | 225 | 140 |
|   | Carbon | $C_2H_6$ | .50 |   |   |

Example 1 is the preferred multicomponent gas and is comprised of methane ($CH_4$), ethane ($C_2H_6$), propane ($C_3H_8$), nitrogen ($N_2$), and neon (Ne). With this particular mixture, temperatures as low as 63K are possible. Nitrogen has a normal boiling point of approximately 77K. The hydrocarbons methane, ethane and propane have higher normal boiling points than nitrogen (112K, 185K, and 228K, respectively), but provide a much higher Joule-Thompson cooling effect or cooling rate. Alseev et al. have shown that ethane and propane both dissolve in methane. Moreover, because methane will dissolve in nitrogen, a mixture of ethane, propane, and methane will also dissolve in nitrogen.

The preferred sorbent used in conjunction with the preferred multicomponent gas is a carbon powder that will primarily adsorb the hydrocarbons. An example of such a carbon powder is known by the trade name Saran Carbon made from polyvinylidene chloride (PVDC).

The neon component of the multicomponent gas sorbate is not adsorbed very well by carbon. Hence, as signified by the "NONE/VOID" entry in Table I, the majority of the neon component occupies a void space 44 defined by the geometry of the sorption pump or, alternatively, occupies the voids that exist within the powder or granular structure of the carbon sorbent. Nitrogen will be adsorbed somewhat on the carbon, but not as well as the hydrocarbons. Thus, some of the nitrogen may also remain in the voids.

In Example 2, a multigas sorbate of hydrogen ($H_2$), nitrogen ($N_2$), ethane ($C_2H_6$), propane ($C_3H_8$), and methane ($CH_4$) operates with a mixed sorbent of vanadium and carbon. The carbon sorbent physically absorbs the hydrocarbon and the nitrogen, whereas the vanadian powder chemically absorbs the hydrogen. When the sorbent is heated, the constituent gases are released in the known fashion.

Examples 3 and 4 disclose multicomponent gas sorbates that are used with carbon sorbents. Other sorbents that will work with Examples 1 and 2 include zeolite and alumina. The intended carbon sorbent is either a charcoal granule sorbent or a charcoal powder sorbent having an intrinsic void space in the granular or powder structure of approximately 70% by volume. The sorbate gas in Example 3 is comprised of nitrogen ($N_2$) and methane ($CH_4$), whereas the sorbate gas in Example 4 is comprised of ethane ($C_2H_6$) and methane ($CH_4$). Unlike Examples 1 and 2, the multicomponent gas sorbates in Examples 3 and 4 are fully, or nearly fully sorbed and desorbed by the carbon sorbate. A mixing chamber is still required, however, because the constituent gases are desorbed at different rates.

Those skilled in the art will appreciate that various adaptations and modifications of the just-described preferred embodiment can be configured without departing from the scope and spirit of the invention. For example, other refrigerant gases such as R13 ($CClF_3$) or R14 ($CF_4$) may be used to implement the herein invention. R13 and $R_{14}$ are standard refrigerants defined by the American Society of Heating & Refrigeration. Therefore, it is to be understood that, within the scope of the appended claims, the invention may be practiced other than as specifically described herein.

We claim:

1. A cryogenic cooling apparatus comprising:
    a multicomponent gas containing at least a first component gas and a second component gas, said second component gas having a lower boiling point than said first component gas;
    a Joule-Thomson valve for partially liquefying said multicomponent gas as it passes therethrough; and
    a sorption compressor for providing said Joule-Thomson valve with said multicomponent gas at elevated pressure, said sorption compressor containing a sorbent having a greater affinity for sorbing and desorbing said first component gas than said second component gas, whereby said first component gas operates as a propellant for said second component gas.

2. The cryogenic cooling apparatus of claim 1 wherein:
    said sorbent is comprised of at least one material selected from the group consisting of carbon and vanadium; and
    said multicomponent gas is comprised of at least two gases selected from the group consisting of Neon (Ne), Nitrogen ($N_2$), Hydrogen ($H_2$), Methane ($CH_4$), Ethane ($C_2H_6$), Propane ($C_3H_8$), Oxygen (O), R13 ($CClF_3$), and R14 ($CF_4$).

3. The cryogenic cooling apparatus of claim 2 wherein said sorbent is carbon and said multicomponent gas is comprised of the following constituent gases:
    Neon (Ne);
    Nitrogen ($N_2$);
    Methane ($CH_4$);
    Ethane ($C_2H_6$); and
    Propane ($C_3H_8$).

4. The cryogenic cooling apparatus of claim 3 wherein the relative percentages of said constituent gases are substantially as follows:
    25% Neon (Ne);
    25% Nitrogen ($N_2$);
    15% Methane ($CH_4$);
    15% Ethane ($C_2H_6$); and
    15% Propane ($C_3H_8$).

5. The cryogenic cooling apparatus of claim 2 wherein said sorbent is a combination of carbon and vanadium and said multicomponent gas is comprised of the following constituent gases:
    Hydrogen ($H_2$)
    Nitrogen ($N_2$)
    Methane ($CH_4$)
    Ethane ($C_2H_6$); and
    Propane ($C_3H_8$).

6. The cryogenic cooling apparatus of claim 5 wherein the relative percentages of said constituent gases are substantially as follows:
    25% Hydrogen ($H_2$)
    25% Nitrogen ($N_2$)
    15% Methane ($CH_4$)
    15% Ethane ($C_2H_6$); and
    20% Propane ($C_3H_8$).

7. The cryogenic cooling apparatus of claim 2 wherein said sorbent is carbon and said multicomponent gas is comprised of the following constituent gases:
    Nitrogen ($N_2$); and
    Methane ($CH_4$).

8. The cryogenic cooling apparatus of claim 7 wherein the relative percentages of said constituent gases are substantially as follows:
    30% Nitrogen ($N_2$); and
    70% Methane ($CH_4$).

9. The cryogenic cooling apparatus of claim 2 wherein said sorbent is carbon and said multicomponent gas is comprised of the following constituent gases:
    Methane ($CH_4$); and
    Ethane ($C_2H_6$).

10. The cryogenic cooling apparatus of claim 9 wherein the relative percentages of said constituent gases are substantially as follows:
    50% Methane ($CH_4$); and
    50% Ethane ($C_2H_6$).

11. The cryogenic cooling apparatus of claim 1 wherein said sorbent only occupies a portion of the interior of said sorption compressor so as to define a void therein, whereby substantially all of said first component gas may be sorbed by said sorbent and substantially all of said second component gas may occupy said void.

12. A multigas cryogenic refrigeration system comprising:
    a multicomponent gas including at least a first component gas and a second component gas having a lower boiling point than said first component gas;
    conduit means including a mixing means, a Joule-Thomson valve, and a liquefaction vessel; and first and second sorption compressors containing a sorbent for cyclically pumping said multicomponent gas therebetween and through said conduit means, said sorption compressors being alternately heated and cooled, whereby one of said sorption compressors is desorbing said first component gas so as to propel said second component gas and said first component gas into said conduit means, said first and second component gases being mixed in said mixing means and then being cooled and partially liquefied by expansion through said Joule-Thomson valve into said liquefaction vessel, the liquid evaporating and returning to the other sorption compressor where the first component gas is sorbed in preparation for another cycle.

13. The multigas cryogenic refrigeration system of claim 12, wherein said sorption compressors further comprises:

said sorbent occupying an input portion and being at least partially absent from an output portion of said first and second sorption compressors so as to define a void at or near the output portion, said sorbent being capable of undergoing a reversible sorption process with the first component gas, whereby the first component gas will be primarily present in said sorbent material and the second component gas will be primarily present in said void of said first container.

14. The multigas cryogenic refrigeration system of claim 13 wherein said sorbent of said sorption compressors comprises:

a mixture of first and second sorbent materials, said first sorbent material physically adsorbing said first component and said second sorbent material chemically absorbing said second component gas.

15. The multigas cryogenic refrigeration system of claim 14 wherein:

said first sorbent material is comprised of carbon;

said first component gas is comprised of at least one gas selected from the group consisting of Nitrogen ($N_2$), Methane ($CH_4$), Ethane ($C_2H_6$), Propane ($C_3H_8$);

said second sorbent material is comprised of vanadium; and said second component gas is comprised of Hydrogen ($H_2$).

16. An improved gas for a cryogenic refrigerator of the type where a gas is pumped and expanded through an orifice by being desorbed from a sorbent in a sorption container, the improvement comprising:

a multicomponent gas, said multicomponent gas including a first gas and a second gas having a lower normal boiling point than the first gas, the desorption of the first gas acting as a propellant for pumping and expanding said second gas through the orifice.

* * * * *